BENJAMIN LECKRONE, OF SOMERSET, OHIO.

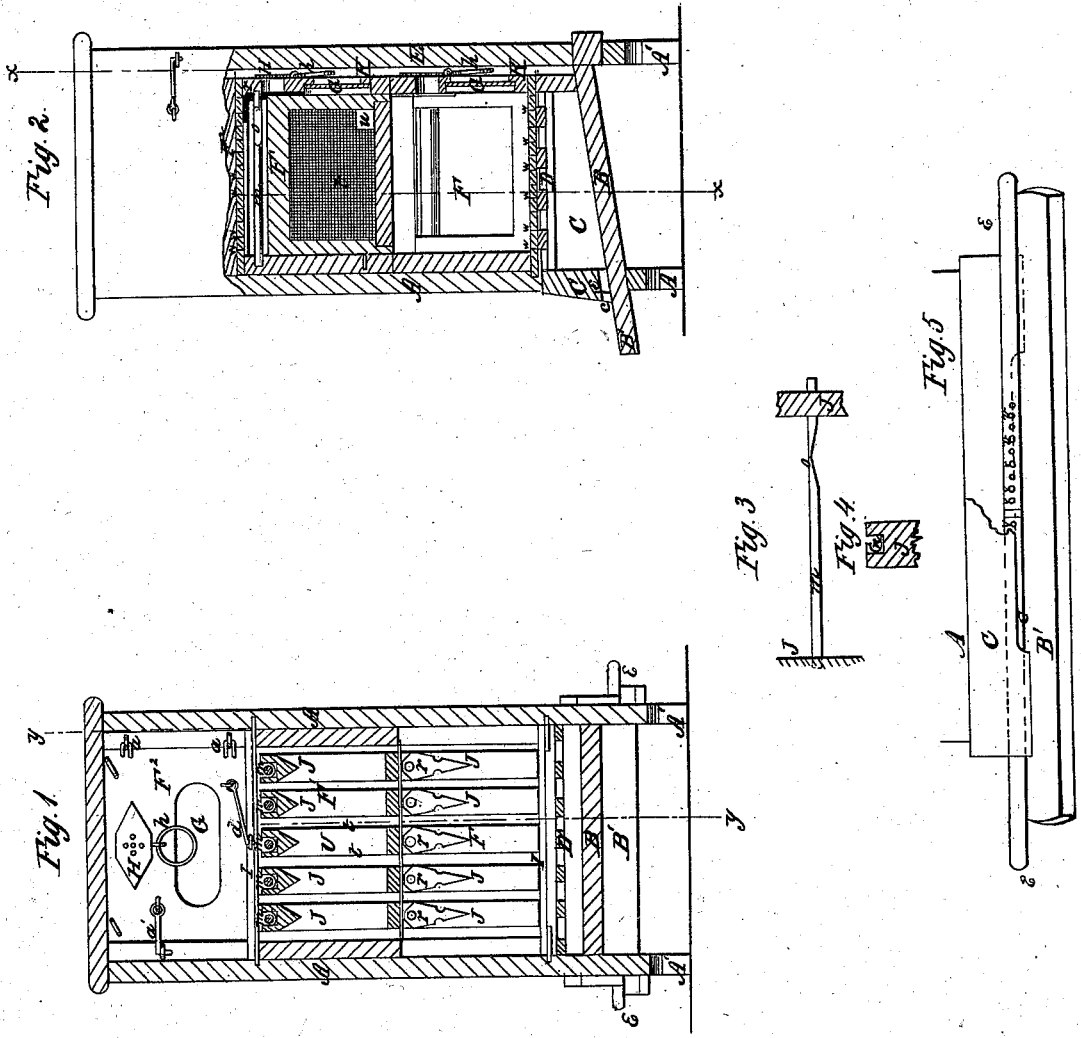

Letters Patent No. 83,514, dated October 27, 1868.

IMPROVEMENT IN BEE-HIVE.

The Schedule referred to in these Letters Patent and making part of the same.

*To all whom it may concern:*

Be it known that I, BENJAMIN LECKRONE, of Somerset, in the county of Perry, and State of Ohio, have invented a new and improved Bee-Hive; and I do hereby declare that the following is a full, clear, and exact description of the construction and operation of the same, reference being had to the annexed drawings, making a part of this specification, in which—

Figure 1 is a vertical cross-section, taken in the line $x\,x$, fig. 2.

Figure 2 is a vertical longitudinal section, on the line $y\,y$, fig. 1.

Figure 3 is a view of the rod upon which the comb-frames are hung.

Figure 4 is a cross-section of the top of a comb-frame.

Figure 5 is an elevation, showing the form of the bee-entrance, and the means for adjusting it.

This invention relates to several improvements in the construction of bee-hives, whereby the entrance of the bees to, and their movements and operations in, the hives can be perfectly regulated and controlled, and whereby the hive can be more conveniently handled, and will be better adapted to secure the health and comfort of the bees than any hitherto in use.

In the drawings, A A represent the upright exterior walls of the hive, resting upon legs A' A', which are intended to keep the bottom of the hive from contact with the board or plank shelf under it, and thereby prevent dampness and mould from accumulating there, and affecting the health and comfort of the bees, and the condition of the honey.

The bottom, B, of the hive is inclined, terminating in a shelf or ledge, B', under the bee-entrance, and forming a foot-rest for the bees to alight upon as they enter the hive. The entrance is a slot, $c$, in a removable cleaning-box, C, which slides in and out of the hive upon the inclined bottom, B, the aperture $c$ forming a low arched entrance, the floor of which is the inclined shelf B', as seen in fig. 2.

The box C is provided with a feed-rack, D, composed of crossed slats, securely fastened together, and fitted into the box in such a manner that it can be readily lifted out of the box when necessary, the box having first been drawn out of the hive. The arch $c$ can be closed, by means of two slides, $e\,e$, to any required degree, so as to exclude the bees altogether, or to admit one, two, three, or twenty at a time. The slides are perforated, as seen at $v\,v\,v$, fig. 5, in order to admit fresh air, at all times, to the bees confined within, or from any cause remaining within the hive.

On the side of the hive opposite to the bee-entrance is a hinged door, E, extending the whole height of the hive, and when open, exposing to view the rear edge of the box C, and the front side of all the comb-boxes.

The latter are shown at F F¹ F², each having a glass window, G, and a perforated ventilating-plate, H. These boxes are placed in the hive one above another, as seen in figs. 1 and 2, the lower box sliding on metal ways, inserted in grooves, in the side of the case, and all having an open-air space, K, between their front sides and the wall of the hive.

The bees enter at $c$, pass up through the feed-rack D, and up through the lower boxes to the top of the hive. Slide-plates or boards, I I I, may be introduced between the several comb-boxes, and under the lower one, to separate one from another, and to confine the bees, or any number of them, in any one or more of the boxes, if at any time it should be necessary, as is frequently the case. These slides, when used to separate the boxes, or confine any of the bees therein, should be perforated or foraminated, as shown at $w\,w$, fig. 2, in order to afford the bees plenty of fresh air, which they need no less than mankind.

The comb-frames J J hang from wires or horizontal rods $m\,m\,m$, stretched across the top of the comb-boxes. The front ends of the rods project a little from their supporting-bar. The frames are provided with a catch or hook, $n$, on the rear end of their upper edge, which can be inserted upon the wires or rods $m\,m$, at a point, $c$, where they are flattened for the purpose, and after having been thus inserted, can be slid along on the rods, without the possibility of becoming detached therefrom, the rods being too stout to pass through the narrow jaw of the hook, except at the flattened portion, as above described.

The rear end of the comb-frames being thus connected with the rods, the frames are slid back, until the front end of the rods enters a hole in a lug, $r$, projecting upward from the front edge of the frame, and thus supports the front edge of the frame. In this manner, the frames can be readily attached to or removed from the boxes one by one, the front side of each box forming a door, hinged as seen at $a\,a$, and latched, as shown at $a'\,a'$, which may be opened to admit of removing said frames.

One of the comb-frames in each box may be provided with wire gauze on each side, as shown at $t\,t$, figs. 1 and 2, thus forming a narrow cell or chamber, which may have a door, $u$, as seen in fig. 2. This provision is made for the purpose of confining the queen. When it is desired to introduce an Egyptian or Italian queen, the common queen is removed or destroyed, food is placed in the gauze frame, and the foreign queen is placed within it, and kept there until the bees become familiar with her, when such frame can be removed, and a common one inserted in its place.

Each comb-frame is provided with a hook, $d$, which catches into an eye or staple, fixed in the front edge of each slide-board I. By this means the slide-boards are connected with the comb-frame, so as to be withdrawn with them, thus confining the bees in the frame.

The advantages of this improved hive over all others in use are manifold and obvious. Besides the dryness and healthiness resulting from its being placed on standards or legs, so that no mould or moisture can accumulate about its floor, the arrangement of the ventilators to secure a constant supply of fresh air, which can circulate through all parts of the hive freely, enables the bees to live and work, in any part of the hive, with a degree of comfort and health not attainable in any other hitherto invented.

In the third place, the door E being on the side opposite to the bee-entrance, can be opened, and the internal condition of the hive inspected, without disturbing the bees, or interfering with their operations in the least.

In the fourth place, any one of the boxes F F¹ F² can be introduced or removed, independently of the others, and, by means of the slide-boards I I, above and below it, the bees can be confined in it, or it can be removed, with the bees confined in it, at pleasure.

In the fifth place, the comb-frames J J can each be independently inserted or removed, without the slightest difficulty or delay, and without removing or disturbing the box to which such frame may be attached, thereby affording the operator great convenience in searching for moths, or for the queen, or in taking out the comb in sections or part sections. Any single frame may, by this construction, be inserted or removed without disturbing any other frame, and without interfering in the least with the operations of the bees in other parts of the same box.

In the sixth place, the cleaning-box C, having the feed-rack D, is of great importance, not only enabling the offal, &c., to be readily removed, but enabling the operator to clean the feed-rack without difficulty, and to insert or remove food for the bees, whenever they may need it, without disturbing them. In the season of autumn, when the bees are down, I would employ this rack for the purpose of feeding the bees, simply withdrawing the box C, placing the food on the rack, and inserting the box again. In the winter, when the bees are in the boxes above, I would simply withdraw some of the frames J J, and place the food in the hive above or below them, or in contact with them, above the cleaning-box, as may be thought best at the time.

These being some of the various and important advantages of my improved hive,

What I claim as new in its construction, for the purpose of securing these advantages, and desire to cover and protect by Letters Patent, is as follows:

1. I claim the device for hanging the frames J J, so that they are independently attachable to or removable from the sliding boxes which support them, such device consisting essentially of the rods m m, flattened at o, and operating, in connection with the hook n and the perforated lug r, substantially as described.

2. I claim the combination and arrangement of the feed-rack D and cleaning-box C, substantially as described.

3. I claim the boxes F F¹ F², when constructed with the front doors hinged at a a, latched at a', having the catches or hooks d d, by which the slide-boards can be attached to them at pleasure, and containing the comb-frames J J, substantially as described.

4. I claim the arrangement and combination of the ventilating-aperture and bee-entrance c, the foraminated slides I I, the foraminated plates H H, and the space K, between the front of the comb-boxes and the wall of the hive, for the purpose of affording a free ventilation to all parts of the hive, whether the bees are confined or free.

5. I claim the arrangement of the entrance c, cleaning-box C, feed-rack D, boxes F F¹ F², comb-frames J J J, windows G G, ventilators H H, and door E, substantially as and for the purpose set forth.

BENJAMIN LECKRONE.

Witnesses:
  J. C. CURRANS,
  I. D. NIETSCKE.